US00RE44646E

(19) United States
(12) Reissued Patent
Kim et al.

(10) Patent Number: US RE44,646 E
(45) Date of Reissued Patent: Dec. 17, 2013

(54) APPARATUS AND METHOD FOR PROCESSING ADDITIONAL INFORMATION IN TELEVISION

(75) Inventors: Joon-Hwan Kim, Seoul (KR); Pil-Sang Ju, Suwon-si (KR); Young-Hwan Pan, Suwon-si (KR)

(73) Assignee: SAMSUNG Electronics Co., Ltd., Suwon-si (KR)

(21) Appl. No.: 11/717,771

(22) Filed: Mar. 14, 2007

Related U.S. Patent Documents

Reissue of:
(64) Patent No.: 6,867,815
Issued: Mar. 15, 2005
Appl. No.: 09/984,983
Filed: Oct. 31, 2001

(30) Foreign Application Priority Data

Mar. 9, 2001 (KR) ..... 2001-12242

(51) Int. Cl.
*H04N 7/00* (2011.01)
*H04N 11/00* (2006.01)
*H04N 5/445* (2011.01)

(52) U.S. Cl.
USPC ..... 348/465; 348/473; 348/563; 348/569

(58) Field of Classification Search
USPC ..... 348/460–469, 474, 563, 564, 569, 570
See application file for complete search history.

(56) References Cited

U.S. PATENT DOCUMENTS 4,605,964 A * 8/1986 Chard ..... 725/28
5,617,565 A * 4/1997 Augenbraun et al. ..... 1/1
5,828,402 A * 10/1998 Collings ..... 725/28
5,977,962 A * 11/1999 Chapman et al. ..... 725/37
6,005,561 A * 12/1999 Hawkins et al. ..... 715/234
6,031,577 A * 2/2000 Ozkan et al. ..... 348/465
6,104,423 A * 8/2000 Elam ..... 725/28
6,335,763 B1 * 1/2002 Nishio et al. ..... 348/564
6,549,241 B2 * 4/2003 Hiroi ..... 348/460

FOREIGN PATENT DOCUMENTS

KR 1999-0048407 7/1999

* cited by examiner

*Primary Examiner* — Michael Lee
(74) *Attorney, Agent, or Firm* — Stanzione & Kim, LLP

(57) ABSTRACT

An additional information processing apparatus and method selectively processes and stores additional information contained in a TV broadcast signal according to specifications set by a user, subdivides information of the type of additional information received in real time, and displays the information on a screen. Additional information contained in a broadcast signal is classified by type before transmission. Only additional information of the type(s) desired by a user is selected and acquired from the received additional information. The type(s) of additional information acquired is (are) displayed on a screen in real time. Accordingly, only the additional information needed by the user is selectively stored in memory and memory can be efficiently used. Since the type(s) of additional information received is (are) displayed on the screen in detail, the user can easily understand the type(s) of additional information being received currently so that the additional information can be effectively used. In addition, subdivided additional information suitable for the various classes of TV viewers can be developed so that additional information contents can be efficiently developed.

27 Claims, 3 Drawing Sheets

APPARATUS AND METHOD FOR PROCESSING ADDITIONAL INFORMATION IN TELEVISION

Matter enclosed in heavy brackets [ ] appears in the original patent but forms no part of this reissue specification; matter printed in italics indicates the additions made by reissue.

CLAIM OF PRIORITY

This application makes reference to, incorporates the same herein, and claims all benefits accruing under 35 U.S.C. §119 from my application APPARATUS AND METHOD FOR PROCESSING AN ADDING INFORMATION ON TELEVISION filed with the Korean Industrial Property Office on 9 Mar. 2001 and there duly assigned Ser. No. 12242/2001.

BACKGROUND OF THE INVENTION

1. Technical Field

The present invention relates to an apparatus and method for processing information in a television (TV), and more particularly, to an additional information processing apparatus and method for selectively processing and storing additional information contained in a TV broadcast signal according to specifications set by a user, for subdividing information on the type of additional information received in real time, and for displaying the information on a screen.

2. Related Art

As data processing techniques develop, a TV station transmits various types of additional information, including general information on TV programs, in addition to video and audio signals. A TV receiver receives the additional information, and uses the additional information according to a TV viewer's request.

For such data broadcasts in an analog broadcast system, the additional information is embedded in a predetermined horizontal synchronizing signal section, which does not influence the picture that is displayed, and is then transmitted. Thus, there is a limit to the amount of additional information which can he transmitted. Consequently, various information services cannot be provided. However, as digital broadcast systems have developed, a large amount of additional information which TV viewers can conveniently use can be provided. Accordingly, many different types of additional information, such as that relating to education, games and on-line commerce information, as well as general program information, can be provided.

In conventional television, all additional information received is stored in a memory, regardless of the type of additional information. Accordingly, waste of the capacity of memory occurs. Moreover, since unnecessary additional information is stored in the memory, a user suffers inconvenience in utilizing the additional information. In addition, a user cannot recognize in detail the type of information received in real time so that the user cannot efficiently utilize the additional information.

SUMMARY OF THE INVENTION

To solve the above problems, it is an object of the present invention to provide an additional information processing apparatus and method for grouping additional information contained in a broadcast signal by type, for transmitting the grouped additional information, for selectively acquiring additional information on only the type desired by a user, for subdividing information based on the type of additional information received, and for displaying the subdivided information on a television screen.

Accordingly, to achieve the above object of the invention, there is provided an additional information transmitting apparatus for processing additional information for a TV broadcast signal. The apparatus includes: an additional information class code insertion unit for receiving the additional information to be embedded in the broadcast signal, and for inserting a class code indicating the type of the additional information; and a multiplexer for multiplexing coded video data, coded audio data and the additional information, including the class code, and for outputting a single bit stream.

To achieve the above object of the invention, there is also provided an apparatus for processing additional information embedded in a TV broadcast signal. The apparatus includes: a demultiplexer for separating video data, audio data and the additional information from a channel decoded broadcasting signal; a controller for receiving the additional information separated by the demultiplexer, for extracting an additional information class code from the additional information, and for generating an additional information storage control signal and an additional information display control signal when the extracted additional information class code is included in additional information class codes selected by a user; a memory for storing the additional information in an area assigned to the type of additional information in response to the additional information storage control signal; an additional information class display signal generator for generating image data to display the type of information corresponding to the extracted additional information class code on a screen in response to the additional information display control signal; and a video signal processor for decoding the video data separated by the demultiplexer, for mixing the decoded video data and the image data generated from the additional information class display signal generator, and for performing signal processing on the mixed result for display on the TV screen.

To achieve the above object of the invention, there is also provided a method of processing additional information embedded in a TV broadcast signal. The method includes the steps of (a) extracting an additional information class code from the additional information being received, (b) determining whether the extracted additional information class code conforms to a condition of the acquisition of additional information set by a user, and (c) separately storing the additional information in a memory according to its type and displaying the type of additional information on a TV screen when it is determined that the extracted additional information class code conforms to the condition of the acquisition of additional information set by the user in step (b).

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference numerals indicate the same or similar components, and wherein.

DETAILED DESCRIPTION OF THE PRESENT INVENTION

Figure 1:
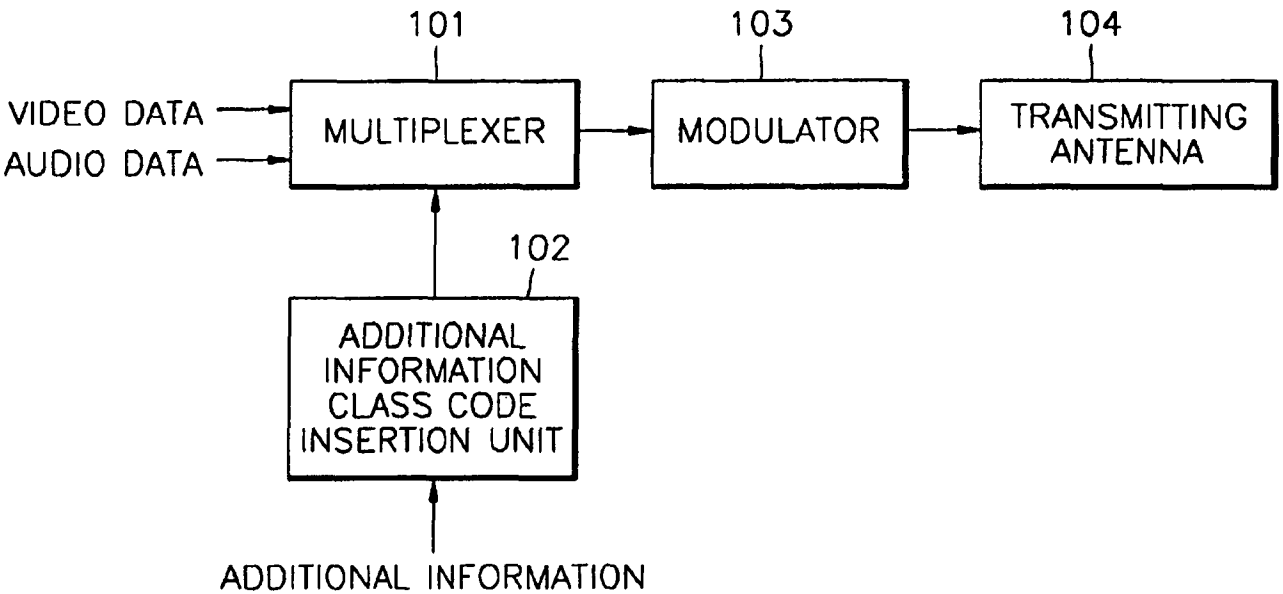
FIG. 1 is a block diagram of an additional information transmitting apparatus according to the present invention.

FIG. 1 is a block diagram of an additional information transmitting apparatus according to the present invention. As shown in FIG. 1, an additional information transmitting apparatus according to the present invention includes a multiplexer 101, an additional information class code insertion unit 102, a modulator 103 and a transmitting antenna 104.

Video and audio signals to be broadcast are separately MPEG-coded by a digital signal processor (DSP) (not shown), and are then inputted to the multiplexer 101. Additional information embedded in a broadcast signal is composed of a variety of contents, such as basic information as to a program and education, games and on-line commerce information.

The additional information class code insertion unit 102 subdivides additional information by type according to its characteristics, and inserts into the additional information class codes denoting the types of additional information. For example, the additional information is subdivided into general program information, education information, game information and on-line commerce information.

The multiplexer 101 multiplexes the coded video and audio data, and the additional information containing the class codes according to broadcast standards, so as to output a single bit stream. Thereafter, the multiplexed data is modulated by the modulator 103, and is then transmitted over the air through the transmitting antenna 104.

Since additional information contained in a broadcast signal transmitted from a broadcast station through such operations has class codes denoting the types of additional information, a TV set can effectively process the additional information using the additional information class codes.

Figure 2:
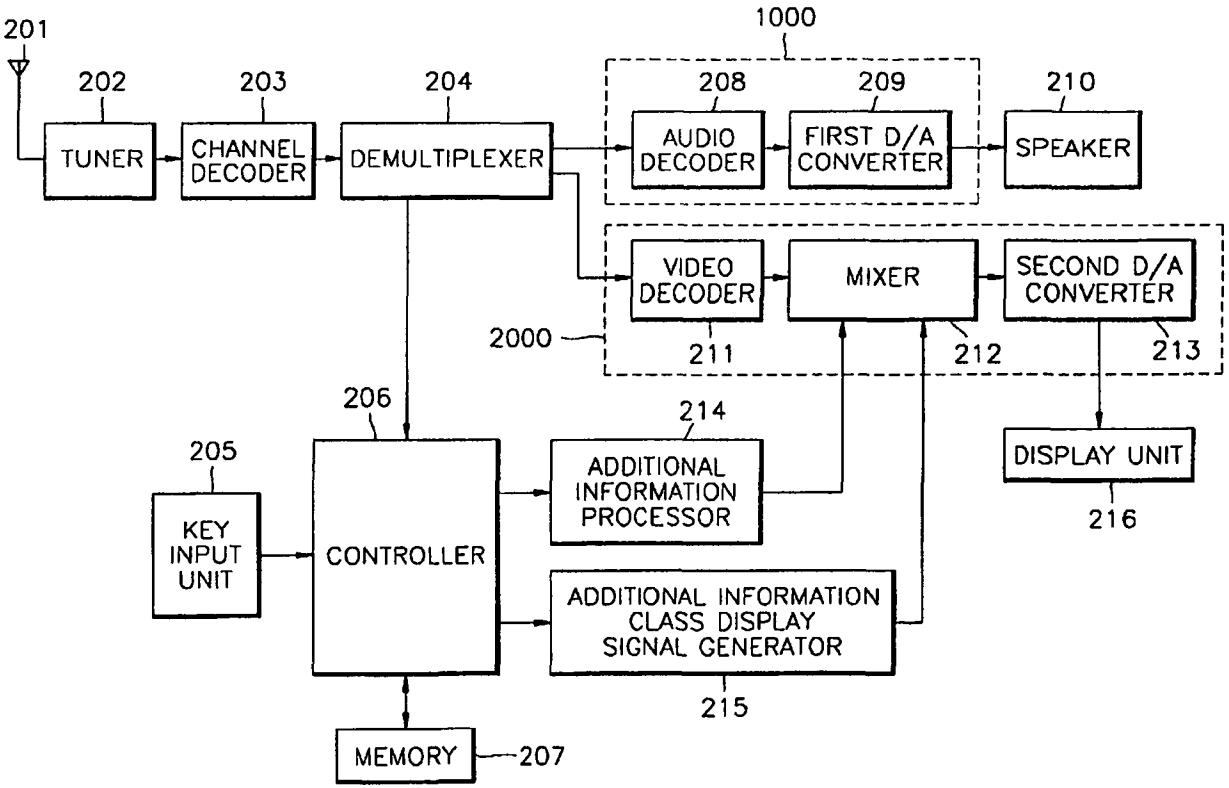
FIG. 2 is a block diagram of an additional information processing apparatus in a television according to the present invention.

The additional information processing operation of a TV set receiving a broadcast signal will be described with reference to FIG. 2. As shown in FIG. 2, an additional information receiving apparatus in a TV according to the present invention includes an antenna 201, a tuner 202, a channel decoder 203, a demultiplexer 204, a key input unit 205, a controller 206, a memory 207, an audio decoder 208, a first digital-to-analog (D/A) converter 209, a speaker 210, a video decoder 211, a mixer 212, a second digital-to-analog (D/A) converter 213, an additional information processor 214, an additional information class display signal generator 215, and a display unit 216.

The audio decoder 208 and the first digital-to-analog (D/A) converter 209 are referred to as an audio signal processor 1000. The video decoder 211, the mixer 212 and the second digital-to-analog (D/A) converter 213 are referred to as a video signal processor 2000.

When a user selects a channel to view after turning on the power of a TV set using a key button on the key input unit 205, the tuner 202 selects and outputs the broadcast signal of the selected channel among the broadcast signals received through the antenna 201 or an input terminal. Then, the channel decoder 203 recovers a digital signal detected from the broadcast signal of the selected channel in packet units, and outputs the recovered packet data to the demultiplexer 204. The demultiplexer 204 separates the recovered packet data into audio data, video data and additional information data and outputs the separated data in the form of individual bit streams.

Then, the audio data is decoded by the audio decoder 208, converted into an analog signal by the first digital-to-analog (D/A) converter 209, and then finally output through the speaker 210. The video data is decoded by the video decoder 211. Thereafter, the decoded video data, additional information-processed data and additional information class display image data are mixed by the mixer 212. The mixed data is converted into an analog signal by the second digital-to-analog (D/A) converter 213, and is then finally output through the display unit 216.

The additional information data output from the demultiplexer 204 is processed by the controller 206. Once the additional information is received, the controller 206 extracts an additional information class code from the additional information. As described in FIG. 1, the additional information class code denotes the type of additional information which has been inserted into the broadcast signal when the broadcast signal is transmitted from a broadcast station.

Thereafter, the controller 206 determines whether the extracted additional information class code satisfies the conditions of the acquisition of additional information. Here, the term "conditions of the acquisition of additional information" denotes information as to the selection of the type(s) of additional information, desired to be acquired from the additional information contained in the broadcast signal, as designated by the user using a key in the key input unit 205. For example, when the user intends to use general program information and education information only from the additional information received, the types of additional information to be selected are restricted to the program information and education information in a user mode for the conditions of the acquisition of additional information. When the user intends to acquire all types of additional information, a default mode is selected.

The controller 206 determines whether the additional information class code extracted from the received additional information is the same as the class code of the type selected by the user. When the extracted additional information class code is the same as the class code of the additional information selected by the user, the controller 206 controls the received additional information corresponding to the class code so that it is stored in a corresponding area of the memory 207, which is divided into a plurality of areas for each type of additional information.

When the extracted additional information class code is the same as the class code of the type selected by the user, the controller 206 also outputs an additional information display control signal corresponding to the additional information class code to the additional information class display signal generator 215. In addition, the controller 206 reads additional information from the memory 207 in response to an additional information processing command received from the key input unit 205.

Next, the additional information class display signal generator 215 generates image data for displaying the type of additional information in response to the additional information display control signal. For example, the image data can be programmed into icon image data implicitly representing the type of additional information. The additional information processor 214 edits the additional information in field or frame units to generate additional information image data.

The mixer 212 mixes the decoded video signal, the additional information image data generated from the additional information processor 214, and the additional information class display image data generated from the additional information class display signal generator 215. The mixed signal is converted into an analog signal by the second digital-to-analog (D/A) converter 213, and is then outputted through the display unit 216.

Figure 3:
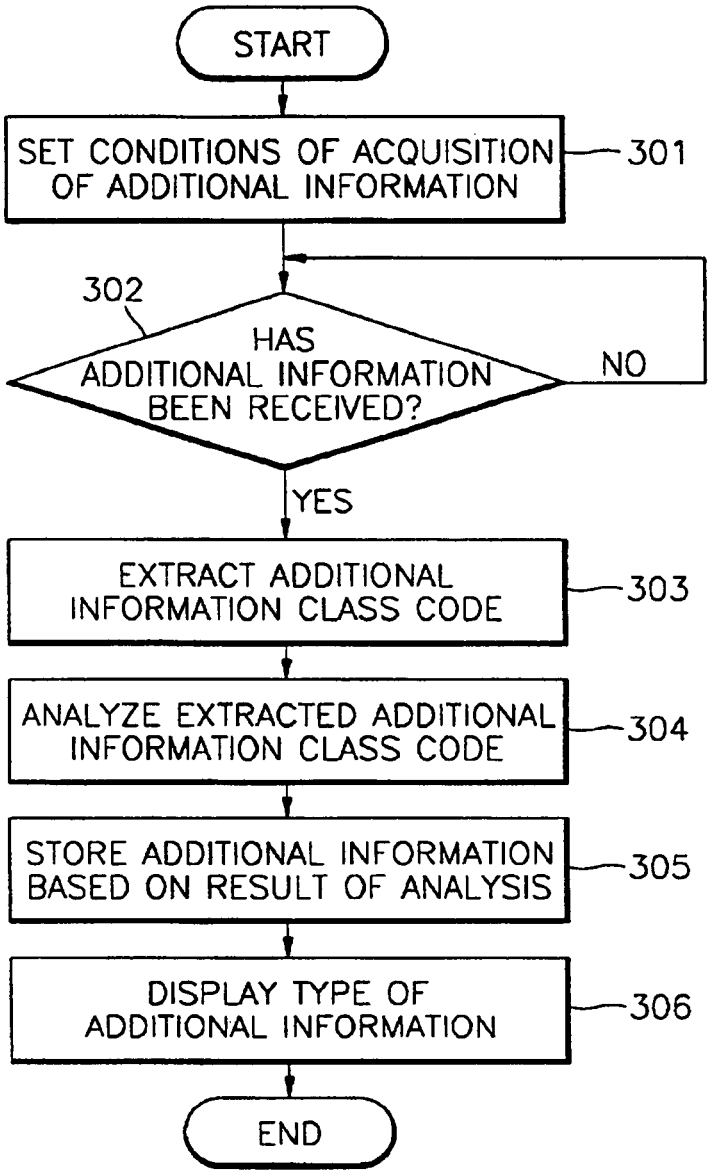
FIG. 3 is a flowchart of a method of processing additional information according to the present invention.

A method of processing additional information in a TV according to the present invention will be described in detail with reference to FIGS. 2 and 3. In step 301, a user sets the conditions for the acquisition of additional information using a function key in the key input unit 205. For example, the conditions of the acquisition of additional information are largely set by a default mode and a user mode. In the default mode, all types of additional information received are separately stored by type in the memory 207, and the additional information currently being received is displayed on a screen regardless of the type of additional information. In the user mode, among all types of additional information received, only additional information of the type selected by the user is stored by type in the memory 207, and the type of additional information is displayed on a screen when the additional information of the type selected by the user is received.

Next, in step 302, it is determined whether additional information is contained in a broadcast signal being received. If additional information is detected in the broadcast signal, in step 303, an additional information class code is extracted in the additional information.

Then, in step 304, the extracted additional information class code is analyzed to determine whether it satisfies the conditions of the acquisition of additional information set by the user. In other words, when the user mode has been set by the user, it is determined whether the extracted additional information class code corresponds to the type of additional information selected by the user.

Based on the result of analysis instep 304, in step 305, the additional information received is classified and stored by type in the memory 207 according to the extracted additional information class code in the default mode. The additional information received is stored at a predetermined area in the memory 207 according to its additional information class code only when the received additional information corresponds to the type selected by the user in the user mode.

In step 306, in the user mode, an image representing the type of the additional information is displayed on a screen, regardless of the type of additional information corresponding to the extracted additional information class code. In the user mode, when the type of additional information being received is the same as that selected by the user, an image representing the type of additional information corresponding to the additional information class code contained in the selected additional information is displayed on the screen. In this case, an image representing the type of additional information can be programmed as an icon. For example, general program information is represented by (i), education information is represented by (e), game information is represented by (g), and on-line commerce information is represented by (c), in the form of icons. These icons are displayed on a part of the screen to inform the user of the type of additional information being received in real time.

Through such a configuration and method, only additional information of the type desired by a user is selectively acquired from the various types of additional information contained in a broadcast signal. The type of additional information received in real time is classified according to its characteristics, and is displayed on a screen in detail so that a user can clearly understand the type of additional information being received currently.

The present invention can be realized as a method, an apparatus, a system and so on. When the present invention is realized as software, the members of the present invention are code segments which execute necessary operations. Programs or code segments may be stored in a processor readable medium, or may be transmitted by a transmission medium or by a computer data signal combined with a carrier in a communication network. The processor readable medium may be any medium which can store or transmit information, such as an electronic circuit, a semiconductor memory device, a ROM, a flash memory, an $E^2$ROM, a floppy disc, an optical disc, a hard disc, an optical fiber medium, or a radio frequency (RF) network. The computer data signal may be any signal which can be transmitted through a transmission medium, such as an electronic network channel, an optical fiber, air, an electromagnetic field, or an RF network.

According to the present invention, additional information contained in a broadcast signal is classified before transmission by type according to its characteristics. In a receiving party, only the additional information of the type (s) desired by a user is selected and acquired from the additional information being received, and the type(s) of additional information acquired is displayed on a screen in real time. Accordingly, only the additional information needed by the user is selectively stored in a memory so that the memory can be efficiently used. Since the type(s) of additional information received is displayed on the screen in detail, the user can easily understand the type(s) of additional information being received currently so that the additional information can be effectively used. In addition, subdivided additional information suitable for the various classes of TV viewers can be developed so that additional information contents can be efficiently developed.

Although the invention has been described with reference to particular embodiments, it will be apparent to one of ordinary skill in the art that modifications to the described embodiments may be made without departing from the spirit and scope of the invention. Therefore, it is obvious that the present invention is not restricted to the specific structures or arrangements shown or described in this specification.

What is claimed is:

1. An apparatus for processing additional information embedded in a television (TV) broadcast signal, said apparatus comprising:

a demultiplexer for separating video data, audio data and the additional information from a channel decoded broadcast signal;

a controller for receiving the additional information separated by the demultiplexer, for extracting an additional information class code from the additional information, and for generating an additional information storage control signal and an additional information display control signal when the extracted additional information class code is included in additional information class codes selected by a user;

a memory responsive to the additional information storage control signal from said controller for storing the additional information in an area assigned to a type of the additional information;

an additional information class display signal generator responsive to the additional information display control signal from said controller for generating image data for displaying on a screen [a] type [of] information corresponding to the extracted additional information class code; and a video signal processor for decoding the video data separated by the demultiplexer, for mixing the decoded video data and the image data generated by the additional information class display signal generator to obtain a mixed result, and for performing signal processing on the mixed result for display on a screen,

*wherein the image data generated by the additional information class display signal generator is icon image data representing the type of additional information.*

[2. The apparatus of claim 1, wherein the image data generated by the additional information class display signal generator is icon image data presenting the type of additional information.]

3. The apparatus of claim 1, further comprising a tuner for receiving and tuning the TV broadcast signal to produce a tuner output, and a channel decoder for channel decoding the tuner output to produce the channel decoded broadcast signal.

4. The apparatus of claim 1, further comprising a key input unit connected to an input of said controller and operable by the user for selecting the additional information class codes.

5. The apparatus of claim 1, wherein said video signal processor comprises:

a video decoder for receiving and decoding the video data separated by said demultiplexer to produce the decoded video data;

a mixer connected to said video decoder and to said additional information class display signal generator for mixing the decoded video data and the image data generated by said additional information class display signal generator; and a digital-to-analog converter connected to said mixer for converting the mixer output to an analog signal for driving a display unit to obtain the display on the screen.

6. The apparatus of claim 5, further comprising an additional information processor connected to an output of said controller and to an input of said mixer for generating additional information image data and for providing the additional information image data to said mixer, said mixer mixing the additional information image data with the decoded video data and the image data generated by said additional information class display signal generator.

7. The apparatus of claim 1, further comprising an audio signal processor connected to said demultiplexer for receiving and processing the audio data separated from the channel decoded broadcast signal by said demultiplexer.

8. The apparatus of claim 7, wherein said audio signal processor comprises:

an audio decoder for decoding the audio data separated from the channel decoded broadcast signal by said demultiplexer to obtain an audio decoder output; and a digital-to-analog converter for converting the audio decoder output to an analog output for driving a speaker.

9. A method of processing additional information embedded in a television broadcast signal, the method comprising the steps of:

(a) extracting an additional information class code from the embedded additional information;

(b) determining whether the extracted additional information class code conforms to a condition of acquisition of the additional information;

(c) generating an additional information display control signal when the extracted additional information class code conforms to the condition of acquisition of the additional information; and (d) displaying the type of the additional information on a screen in response to the additional information display control signal when it is determined that the extracted additional information class code conforms to the condition of the acquisition of the additional information set by the user,

*wherein the type of the additional information is displayed on the screen in the form of icon images specified for each type of additional information.*

[10. The method of claim 9, wherein the type of the additional information is displayed on the screen in the form of icon images specified for each type of additional information.]

11. The method of claim 9, wherein the type of the additional information is displayed through a light emitting device in the form of icon images specified for each type of additional information.

12. The method of claim 9, wherein the condition of acquisition of the additional information is set by a default mode in which all types of received additional information are stored separately by type, and additional information currently being received is displayed regardless of type.

13. The method of claim 9, wherein the condition of acquisition of the additional information is set by a user mode in which only additional information of a type selected by the user is stored and is displayed.

14. The method of claim 9, wherein step (c) further comprises generating an additional information storage control signal when the extracted additional information class code conforms to the condition of acquisition of the additional information; and wherein step (d) comprises separately storing the additional memory in a memory in response to the additional information storage control signal.

15. An apparatus for processing additional information embedded in a television broadcast signal, said apparatus comprising:

a demultiplexer for receiving a broadcast signal, and for separating the additional information from at least one of video data and audio data in the broadcast signal;

a controller for receiving the additional information separated by the demultiplexer, for extracting an additional information class code from the additional information, and for generating an additional information display control signal when the extracted additional information class code is included in additional information class codes selected by a user;

an additional information class display signal generator responsive to the additional information display control signal from said controller for generating image data for displaying on a screen [a] type [of] information corresponding to the extracted additional information class code; and a video signal processor for processing the image data generated by the additional information class display signal generator, *and to mix the image data with the video data* to obtain a signal for display on a screen,

*wherein the image data generated by the additional information class display signal generator is icon image data presenting the type of additional information.*

[16. The apparatus of claim 15, wherein the image data generated by the additional information class display signal generator is icon image data presenting the type of additional information.]

17. The apparatus of claim 15, further comprising a tuner for receiving and tuning the television broadcast signal to produce a tuner output, and a channel decoder for channel decoding the tuner output to produce a channel decoded broadcast signal comprising the broadcast signal received by the demultiplexer.

18. The apparatus of claim 15, further comprising a key input unit connected to an input of said controller and operable by the user for selecting the additional information class codes.

19. The apparatus of claim 15, wherein said video signal processor comprises:

a video decoder for receiving and decoding video data separated by said demultiplexer to produce *the* decoded video data;

a mixer connected to said video decoder and to said additional information class display signal generator for mixing the decoded video data and the image data generated by said additional information class display signal generator; and a digital-to-analog converter connected to said mixer for converting the mixer output to an analog signal for driving a display unit to obtain the display on the screen.

20. The apparatus of claim 19, further comprising an additional information processor connected to an output of said controller and to an input of said mixer for generating additional information image data and for providing the additional information image data to said mixer, said mixer mixing the additional information image data with the decoded video data and the image data generated by said additional information class display signal generator.

21. The apparatus of claim 15, further comprising an audio signal processor connected to said demultiplexer for receiving and processing audio data separated from the broadcast signal by said demultiplexer.

22. The apparatus of claim 21, wherein said audio signal processor comprises:

an audio decoder for decoding the audio data separated from the broadcast signal by said demultiplexer to obtain an audio decoder output; and a digital-to-analog converter for converting the audio decoder output to an analog output for driving a speaker.

23. The apparatus of claim 15, wherein said controller generates an additional information storage control signal, said apparatus further comprising a memory responsive to the additional information storage control signal for storing the additional information in an area assigned to a type of the additional information.

*24. A method of processing additional information embedded in a television broadcast signal, the method comprising the steps of:*

*receiving the television broadcast signal;*

*extracting the additional information from the received television broadcast signal;*

*generating an display image corresponding to the extracted additional information; and*

*displaying the generated display image on the screen;*

*wherein the generated display image is an icon image representing the extracted additional information and having type information indicating a type of the additional information.*

*25. A method of processing additional information embedded in a television broadcast signal, the method comprising the steps of:*

*receiving the television broadcast signal;*

*extracting the additional information from the received television broadcast signal;*

*extracting a class code which includes information for specifying the extracted additional information;*

*generating a display image corresponding to the extracted additional information based on the extracted class code;*

*displaying the generated display image on the screen.*

*26. The method of claim 25, wherein the class code indicates the type of the additional information, and the types of additional information comprises general program information, education information, game information, and on-line commerce information.*

*27. The apparatus of claim 1, wherein the type of the additional information is displayed through a light emitting device in the form of icon images specified for each type of additional information.*

*28. The apparatus of claim 1, wherein the video signal processor outputs to a display unit in real time the icon image data corresponding to additional information that is being received by the apparatus.*

*29. The apparatus of claim 1, wherein the type information identifies the type of the additional information.*

*30. The apparatus of claim 29, wherein the type of the additional information indicated by the type information includes general program information, education information, game information, and on-line commerce information.*

* * * * *